US009581088B2

(12) United States Patent
Qin et al.

(10) Patent No.: US 9,581,088 B2
(45) Date of Patent: Feb. 28, 2017

(54) SYSTEM FOR PERFORMING STAGING CONTROL OF A MULTI-STAGE COMBUSTOR

(71) Applicant: Rolls-Royce PLC, Loondon (GB)

(72) Inventors: Yong Qin, Derby (GB); Andrew Stevenson, Derby (GB)

(73) Assignee: ROLLS-ROYCE plc, London (GB)

( * ) Notice: Subject to any disclaimer, the term of this patent is extended or adjusted under 35 U.S.C. 154(b) by 125 days.

(21) Appl. No.: 14/295,867

(22) Filed: Jun. 4, 2014

(65) Prior Publication Data
US 2015/0027100 A1  Jan. 29, 2015

(30) Foreign Application Priority Data
Jul. 23, 2013 (GB) .................................. 1313140.4

(51) Int. Cl.
F23R 3/34 (2006.01)
F02C 7/228 (2006.01)
(Continued)

(52) U.S. Cl.
CPC ................ F02C 9/263 (2013.01); F02C 7/22 (2013.01); F02C 7/222 (2013.01); F02C 7/228 (2013.01); F02C 9/26 (2013.01); F02C 9/28 (2013.01); F02C 9/34 (2013.01); F23R 3/346 (2013.01); F02C 9/32 (2013.01); F05D 2260/80 (2013.01); F05D 2270/301 (2013.01)

(58) Field of Classification Search
CPC .... F02C 7/22; F02C 7/228; F02C 9/26; F02C 9/263; F02C 9/28; F02C 9/32; F02C 9/34; F02C 7/222; F05D 2270/31; F23R 3/346
See application file for complete search history.

(56) References Cited

U.S. PATENT DOCUMENTS 4,027,473 A   6/1977  Baker
5,743,079 A   4/1998  Walsh et al.
(Continued)

FOREIGN PATENT DOCUMENTS

EP    1662116 A1    5/2006
EP    2261487 A1   12/2010
(Continued)

Primary Examiner — Gerald L Sung
Assistant Examiner — Scott Walthour
(74) Attorney, Agent, or Firm — Oliff PLC

(57) ABSTRACT

A control system is provided for performing staging control of a multi-stage combustor of a gas turbine engine. The fuel is fed to the combustor by a fuel supply system comprising: a plurality of fuel manifolds distributing fuel to respective stages of the combustor, a fuel metering valve operable to control the rate at which fuel passes to the fuel manifolds, and an actuating arrangement which splits the fuel flow from the fuel metering valve between the fuel manifolds. The control system includes a fuel pressure sensor arrangement which senses the fuel pressure at entry to the actuating arrangement, and/or in one or more of the fuel manifolds. The control system further includes a controller which repeatedly: calculates a fuel split between the fuel manifolds based on the sensed fuel pressure(s), and issues a command signal to the actuating arrangement to implement the calculated fuel pressure-based fuel split.

5 Claims, 7 Drawing Sheets

(51) Int. Cl.
F02C 9/28 (2006.01)
F02C 9/26 (2006.01)
F02C 7/22 (2006.01)
F02C 9/34 (2006.01)
F02C 9/32 (2006.01)

(56) References Cited

U.S. PATENT DOCUMENTS

| | | | | |
|---|---|---|---|---|
| 5,802,854 | A * | 9/1998 | Maeda | F23R 3/346 |
| | | | | 60/39.821 |
| 6,470,258 | B1 * | 10/2002 | Leamy | F02C 7/26 |
| | | | | 701/100 |
| 2003/0056521 | A1 * | 3/2003 | Dewis | F02C 7/26 |
| | | | | 60/778 |
| 2005/0097895 | A1 | 5/2005 | Kothnur et al. | |
| 2006/0137353 | A1 * | 6/2006 | Lieuwen | F01D 21/003 |
| | | | | 60/772 |
| 2007/0089395 | A1 | 4/2007 | Fujii et al. | |
| 2009/0241510 | A1 | 10/2009 | Gallagher et al. | |
| 2010/0025688 | A1 | 2/2010 | Murakami et al. | |
| 2010/0173253 | A1 | 7/2010 | Mohr et al. | |
| 2012/0271527 | A1 * | 10/2012 | Zebrowski | F02C 7/228 |
| | | | | 701/100 |

FOREIGN PATENT DOCUMENTS

| | | |
|---|---|---|
| EP | 2 339 147 A2 | 6/2011 |
| EP | 2 378 490 A1 | 10/2011 |
| EP | 2 514 948 A2 | 10/2012 |
| EP | 2 650 491 A2 | 10/2013 |
| GB | 2 451 144 A | 1/2009 |

* cited by examiner

SYSTEM FOR PERFORMING STAGING CONTROL OF A MULTI-STAGE COMBUSTOR

FIELD OF THE INVENTION

The present invention relates to a system for performing staging control of multi-stage combustor of a gas turbine engine.

BACKGROUND OF THE INVENTION

There are a number of known methods of fuel control for staged gas turbine combustion systems. Combustor flame temperature is an ideal parameter to control fuel split between different flow numbers of a combustor fuel injector, particularly when an optimal split is required for "lean burn" conditions. However, flame temperature is too hot to be measured directly. Hence it needs to be synthesised by sensing different engine parameters and making certain assumptions.

U.S. Pat. No. 5,743,079 describes a method for synthesising flame temperature and regulating fuel flow using high pressure compressor (HPC) exit pressure and temperature, fuel flow rate, combustor pressure drop and high pressure turbine (HPT) nozzle guide vane (NGV) capacity. However, this method suffers from susceptibility to dormant sensor faults (e.g. undetected pressure and/or temperature sensor faults), air leakage in the pneumatic pipe from the HPC used by the HPC exit pressure sensing system, inaccurate fuel flow measurement (e.g. large differences between demanded fuel flow to the fuel metering valve and delivered flow from the valve), variation in fuel flow composition (e.g. water contained in the fuel), engine deterioration, undetected engine component faults (e.g. HPT NGV throat damage), inclement weather, surge, engine starting (including windmill relight and auto relight) and engine flame out.

Further, in staging control methods based on synthesising flame temperature, as more engine parameters and assumptions are applied in attempts to improve the robustness and reliability of the synthesis process (particularly for fast transient conditions), the possibility of inaccuracies increases, along with system cost and weight.

SUMMARY OF THE INVENTION

It would be desirable to provide a staging control strategy which can provide safe fuel staging across the whole power range, especially when faults (which it may not be possible to detect and accommodate) occur in parameters used to synthesize flame temperature, and/or when the engine is operated in certain conditions (e.g. inclement weather) during which the synthesized flame temperature can become invalid.

Accordingly, in a first aspect the present invention provides a control system for performing staging control of a multi-stage combustor of a gas turbine engine, fuel being fed to the combustor by a fuel supply system comprising: a plurality of fuel manifolds distributing fuel to respective stages of the combustor, a fuel metering valve operable to control the rate at which fuel passes to the fuel manifolds, and an actuating arrangement which splits the fuel flow from the fuel metering valve between the fuel manifolds, wherein the control system includes:

a fuel pressure sensor arrangement which senses the fuel pressure at entry to the actuating arrangement, and/or in one or more of the fuel manifolds; and a controller which repeatedly: calculates a fuel split between the fuel manifolds based on the sensed fuel pressure(s), and issues a command signal to the actuating arrangement to implement the calculated fuel pressure-based fuel split.

Thus advantageously the sensed fuel pressure(s) is used by the controller (e.g. an engine electronic controller or EEC) to calculate the fuel split. Although this approach may not provide an optimal fuel split, e.g. for lean burn applications, it can require only few measurements (i.e. the sensed pressure(s)), and can thus be made fault tolerant. Further, the calculated fuel splits can be compatible with safe engine operation under conditions when a synthesized flame temperature could become invalid.

In general, the controller may calculate a fuel pressure-based fuel split which diverts fuel away from a particular manifold when the sensed fuel pressure(s) indicates that the fuel pressure in that manifold has exceeded a respective upper threshold pressure. Additionally or alternatively, the controller may calculate a fuel pressure based fuel split which diverts fuel towards a particular manifold when the sensed fuel pressure(s) indicates that the fuel pressure in that manifold is below a respective lower threshold pressure. In this way, although the calculated fuel split may not be optimal from a fuel efficiency perspective, it can still be safe, e.g. providing combustor conditions which maintain engine thrust.

An approach which uses a fuel pressure-based calculation can be combined with an approach which uses a combustor flame temperature-based calculation. For example, when the calculated fuel pressure-based fuel split corresponds to no change in the current fuel split, the controller may further: calculate a combustor flame temperature, calculate a fuel split between the fuel manifolds based on the calculated combustor flame temperature, and issue a command signal to the actuating arrangement to implement the calculated combustor flame temperature-based fuel split. Thus the fuel pressure-based calculation can effectively provide a safe range of fuel splits, and only if the fuel split is already within that range, does the controller go on to command a split adjustment based on the calculated combustor flame temperature. In this way, engine thrust can be appropriately maintained if the engine e.g. ingests rain or hail, which temporarily compromises the calculated combustor flame temperature, but thereafter more optimal fuel splits based on the calculated combustor flame temperature can resume.

Advantageously, the sensed fuel pressure(s) can also be used for engine health monitoring. For example, the fuel distributed by the fuel manifolds may be fed into the combustor by a plurality of fuel injectors. The control system may then further include: a health monitor which, based on the sensed fuel pressure(s), diagnoses a fault in a pneumatic pipe which extends from the high pressure compressor of the engine (e.g. to connect an air pressure sensor to the high pressure compressor), a fuel injector (and optionally a fuel line between a fuel injector and the respective fuel manifold(s)), the fuel metering valve, or a fuel flow demand to the fuel metering valve. Such a health monitor can make use of a relation between: the sensed fuel pressure (PFuel), the amount of fuel (WFE) delivered to the injectors per second, the high pressure compressor exit pressure (P30), and the total flow number (FN) through the injectors, FN optionally also including restrictors in any fuel lines between the fuel manifold(s) and injectors. For example, the relation can be of the form $WFE = FN \times \sqrt{PFuel - P30}$.

In a second aspect, the present invention provides a fuel supply system for feeding fuel to a multi-stage combustor of a gas turbine engine, the fuel supply system including:
- a plurality of fuel manifolds which distribute fuel to respective stages of the combustor,
- a fuel metering valve operable to control h rate at which fuel passes to the fuel manifolds,
- an actuating arrangement which splits the fuel flow from the fuel metering valve between the fuel manifolds, and
- a control system according to the first aspect.

In a third aspect, the present invention provides the controller of the control system of the first aspect.

In a fourth aspect, the present invention provides a gas turbine engine (e.g. an aircraft engine) having the control system of the first aspect or the fuel supply system of the third aspect.

In a fifth aspect, the present invention provides a health monitoring system for monitoring the health of a gas turbine engine in which one or more fuel manifolds feed fuel to fuel injectors of the combustor of the engine, and a fuel metering valve is operable to control the rate at which fuel passes to the fuel manifolds, wherein the health monitoring system includes:
- a fuel pressure sensor arrangement which senses the fuel pressure in the fuel passed to the fuel manifolds by the fuel metering valve; and
- a health monitor which, based on the sensed fuel pressure (s), diagnoses a fault in: a pneumatic pipe which extends from the high pressure compressor of the engine, a fuel injector (and optionally a fuel line between a fuel injector and the respective fuel manifold (s)), the fuel metering valve, or a fuel flow demand to the fuel metering valve. Thus the sensed fuel pressure (s) can be used just for health monitoring purposes, and not for fuel staging.

In a sixth aspect, the present invention provides a fuel supply system for feeding fuel to a combustor of a gas turbine engine, the fuel supply system including:
- one or more fuel manifolds which feed fuel to fuel injectors of the combustor,
- a fuel metering valve operable to control the rate at which fuel passes to the fuel manifolds, and
- a health monitoring system according to the fifth aspect for monitoring the health of the engine.

In a seventh aspect, the present invention provides the health monitor of the health monitoring system of the fifth aspect.

In an eighth aspect, the present invention provides a gas turbine engine (e.g. an aircraft engine) having the health monitoring system of the fifth aspect or the fuel supply system of the sixth aspect.

Further optional features of the invention will now be set out. These are applicable singly or in any combination with any aspect of the invention.

An air pressure sensor may be provided to sense an engine intake or ambient air pressure. The sensed fuel pressure can then be normalised by the sensed air pressure, e.g. before calculating a fuel split or diagnosing a fault.

The fuel supply system may include a pressure raising valve (such as a pressure raising and shut off valve) downstream of the fuel metering valve, the pressure raising valve ensuring that the fuel pressure upstream thereof is maintained at above a predetermined minimum level. The fuel pressure sensor arrangement may then sense the fuel pressure downstream of the pressure raising valve.

The fuel supply system may further include a pressure drop control arrangement operable to regulate a pressure drop across the fuel metering valve, the pressure drop control arrangement maintaining in normal operation a substantially constant pressure drop across the metering valve. The pressure drop control arrangement may comprise a spill valve and a pressure drop control valve. The spill valve and pressure drop control valve may be separate components or may be combined in a single valve.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
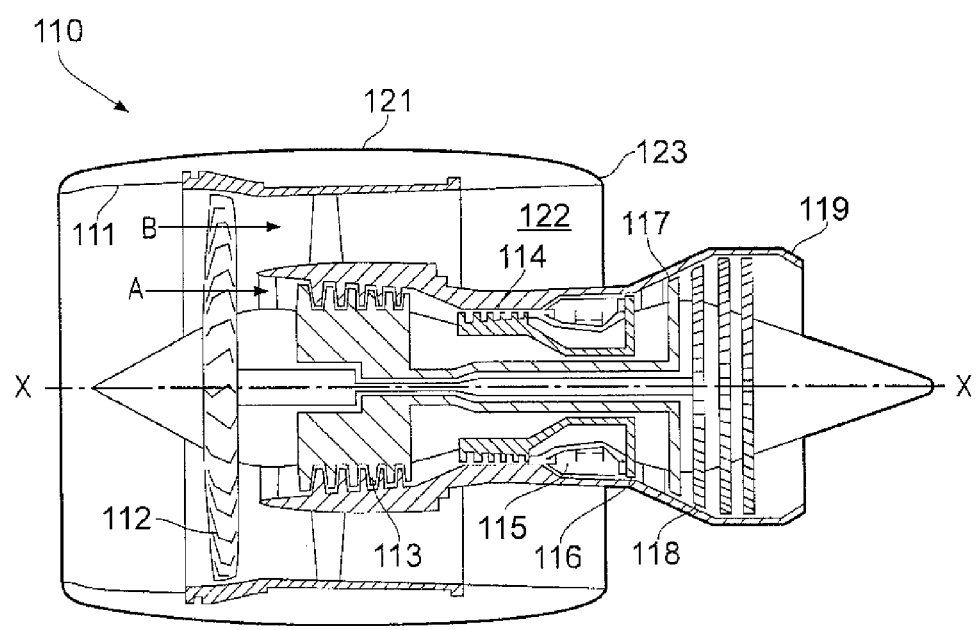
FIG. 1 shows a longitudinal section through a ducted fan gas turbine engine.

With reference to FIG. 1, a ducted fan gas turbine engine incorporating the invention is generally indicated at 110 and has a principal and rotational axis X-X. The engine comprises, in axial flow series, an air intake 111, a propulsive fan 112, an intermediate pressure compressor 113, a high-pressure compressor 114, combustion equipment 115, a high-pressure turbine 116, and intermediate pressure turbine 117, a low-pressure turbine 118 and a core engine exhaust nozzle 119. A nacelle 121 generally surrounds the engine 110 and defines the intake 111, a bypass duct 122 and a bypass exhaust nozzle 123.

During operation, air entering the intake 111 is accelerated by the fan 112 to produce two air flows: a first air flow A into the intermediate pressure compressor 113 and a second air flow B which passes through the bypass duct 122 to provide propulsive thrust. The intermediate pressure compressor 113 compresses the air now A directed into it before delivering that air to the high pressure compressor 114 where further compression takes place.

The compressed air exhausted from the high-pressure compressor 114 is directed into the combustion equipment 115 where it is mixed with fuel and the mixture combusted. The resultant hot combustion products then expand through, and thereby drive the high, intermediate and low-pressure turbines 116, 117, 118 before being exhausted through the nozzle 119 to provide additional propulsive thrust. The high, intermediate and low-pressure turbines respectively drive the high and intermediate pressure compressors 114, 113 and the fan 112 by suitable interconnecting shafts.

The engine has a pumping unit comprising a low pressure (LP) pumping stage which draws fuel from a fuel tank of the aircraft and and supplies the fuel at boosted pressure to the inlet of a high pressure (HP) pumping stage. The LP stage typically comprises a centrifugal impeller pump while the HP pumping stage may comprise one or more positive displacement pumps, e.g. in the form of twin pinion gear pumps. The LP and HP stages are typically connected to a common drive input, which is driven by the engine HP or IP shaft via an engine accessory gearbox.

Figure 2:
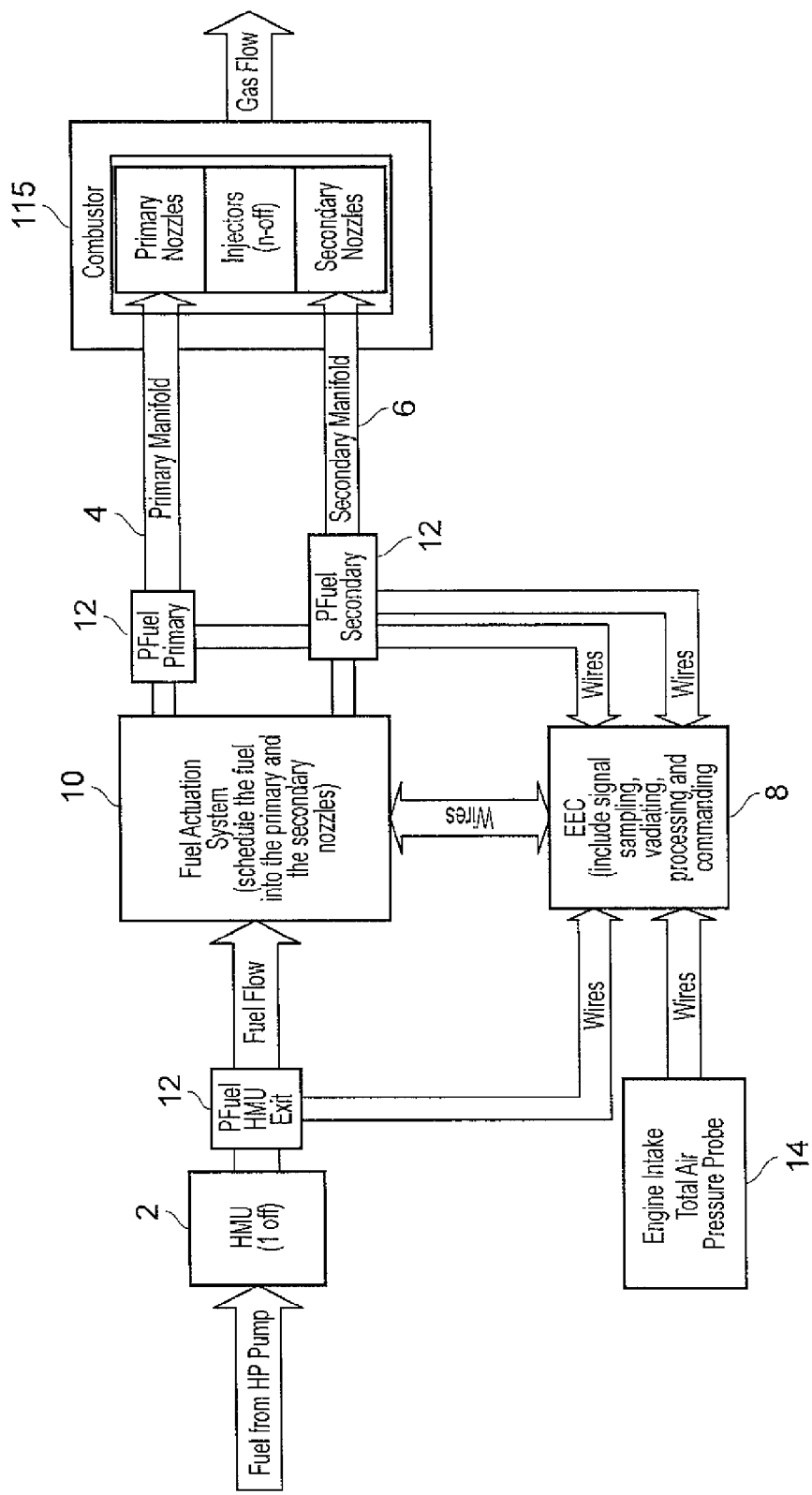
FIG. 2 shows schematically a fuel supply system for the engine of FIG. 1.

FIG. 2 shows schematically a fuel supply system which accepts fuel from the HP pumping stage and feeds it to the combustor 115 of the engine 110.

A hydro-mechanical unit (HMU) 2 comprises a fuel metering valve operable to control the rate at which fuel is allowed to flow to the combustor 115 via primary 4 and secondary 6 manifolds. The HMU further typically comprises: a pressure drop control arrangement (such as a spill valve and a pressure drop control valve) which is operable to maintain a substantially constant pressure drop across the metering valve, and a pressure raising and shut-off valve at the fuel exit of the HMU which ensures that a predetermined minimum pressure level is maintained upstream thereof for correct operation of any fuel pressure operated auxiliary devices (such variable inlet guide vane or variable stator vane actuators) that receive fuel under pressure from the HMU. Further details of such an HMU are described in EP 2339147 A.

The engine EEC 8 commands the HMU fuel metering valve to supply fuel to the combustor 115 at a given flow rate. This fuel leaves the HMU and arrives at a fuel actuating arrangement 10 (typically an arrangement of valves), which splits the fuel under the control of the EEC 8 into two flows: one for the primary manifold 4 and the other for the secondary manifold 6. The primary manifold 4 feeds primary nozzles of a number, n, of fuel injectors of the combustor 115. The secondary manifold 6 feeds secondary nozzles of the fuel injectors. By varying the fuel split between the manifolds, the EEC 8 can thus perform staging control of the engine.

The fuel supply system includes one or more fuel pressure sensors 12. These can be installed in either or both of the pipelines of the primary 4 and secondary 6 manifolds to measure the respective manifold fuel pressures, and/or in the pipeline between the HMU 2 and the actuating arrangement 10 to measure the fuel pressure at entry to the actuating arrangement 10.

The fuel supply system also includes an intake air pressure sensor 14 which senses the engine intake total air pressure.

Figure 3:
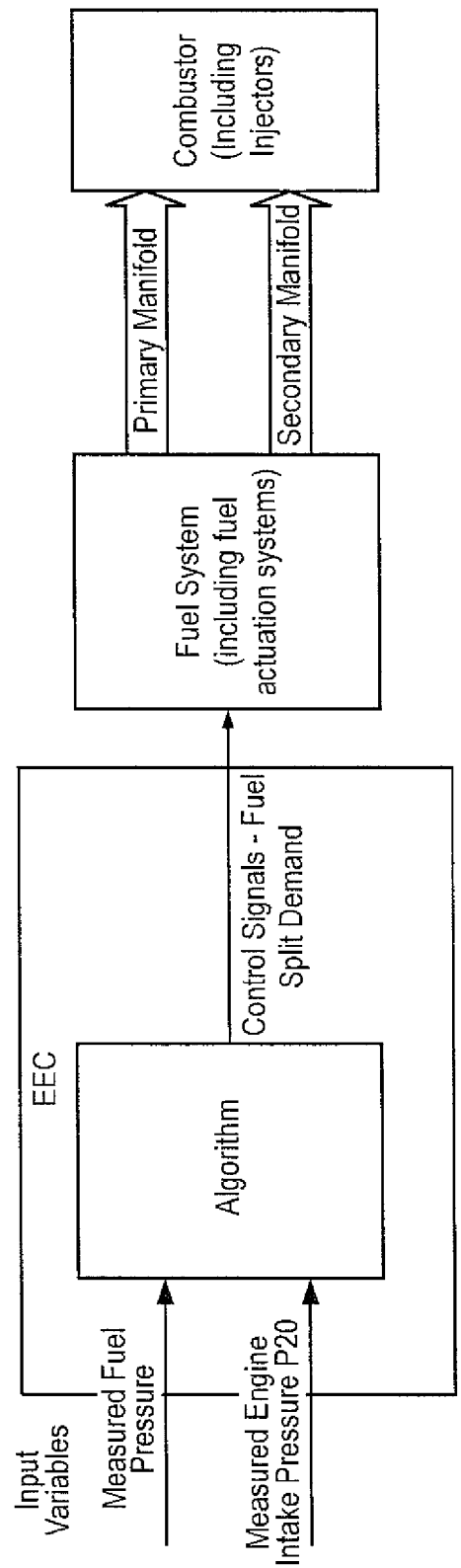
FIG. 3 shows schematically how the fuel supply system of FIG. 2 implements staging control.

The signals from the sensors 12, 14 are sent to the EEC 8 which, as illustrated in FIG. 3, uses them to calculate a fuel split. A command signal implementing the calculated fuel split is then sent by the EEC to the actuating arrangement 10, resulting in staging control of the combustor.

Figure 4:
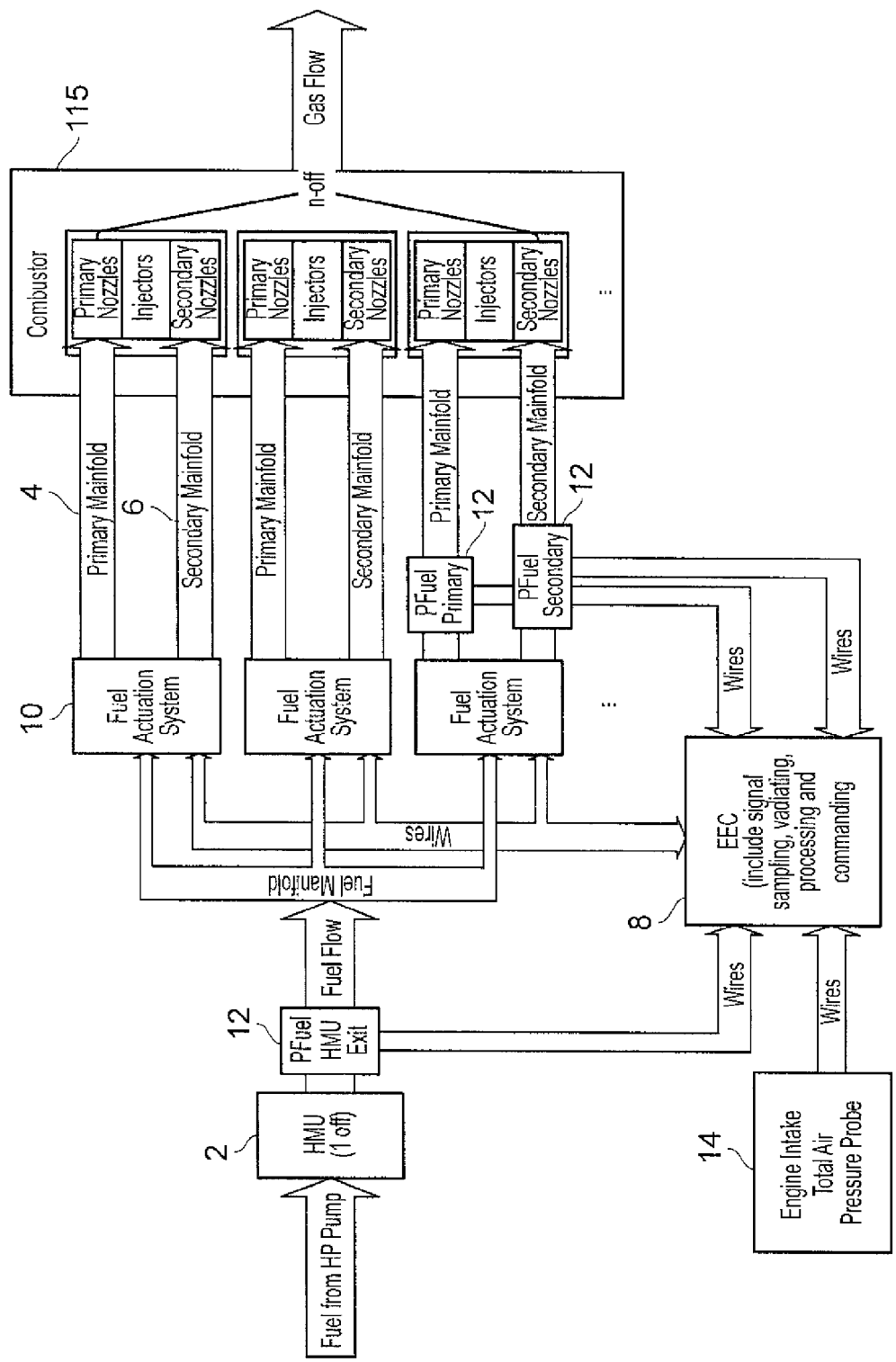
FIG. 4 shows schematically a variant of the fuel supply system of FIG. 2.

FIG. 4 shows schematically a variant of the fuel supply system, in which multiple primary 4 and secondary 6 manifolds supply the fuel injectors. Respective actuating arrangements 10 split the fuel flow for each pair of primary and secondary manifolds. In such a variant, the fuel pressure sensors can be sensed in any one or any number of the primary and secondary manifolds, and/or in the pipeline between the HMU 2 and the actuating arrangements 10.

Figure 5:
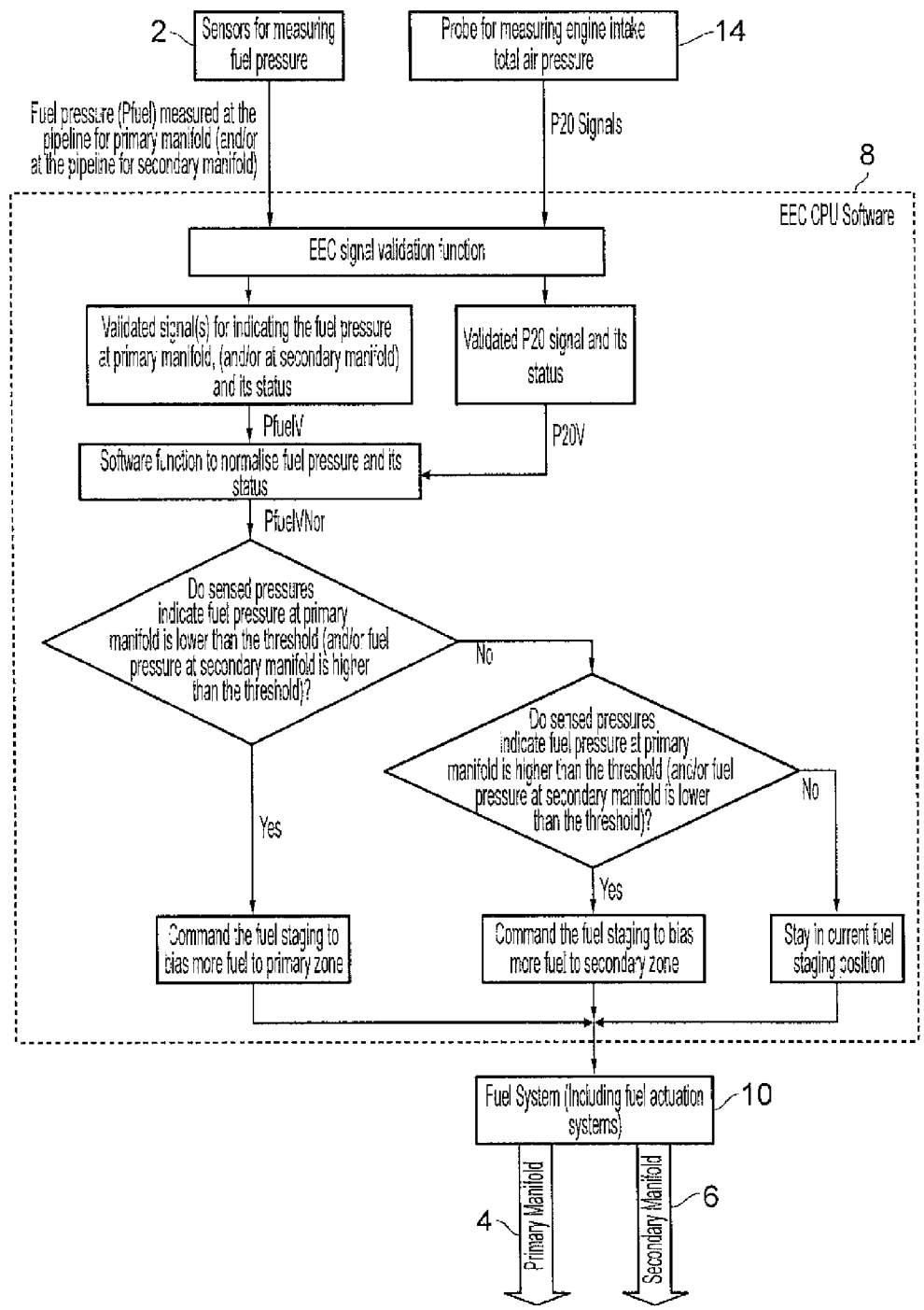
FIG. 5 is a flow diagram illustrating the logic of an EEC control algorithm that uses sensed fuel pressure measurements to provide fuel flow split control signals.

FIG. 5 is a flow diagram illustrating the logic of the EEC control algorithm that uses the sensed fuel pressure measurement to provide fuel flow split control signals. Firstly, the sensed fuel pressure PFuel (which generally comprises signals from two or more sensors 12) and the sensed engine intake total air pressure P20 are validated by the EEC to check for faults such as an Out of Range Fault which indicates that a raw pressure signal is greater than an upper limit or less than a lower limit, and an In Range Fault which indicates that the absolute different between two raw pressure signals is greater than a given tolerance. The limits and tolerance can be pre-defined and based on the type of sensor.

Assuming no fault is indicated, the EEC 8 raises a status flag to indicate a validated PFuel status and selects a source as the validated fuel pressure signal Fuel. The source can be a raw PFuel signal, or the average of a subset of PFuel raw signals, or the average of all PFuel raw signals. Similarly, a validated P20 (P20V) is defined and a corresponding status flag raised.

Next, the validated engine intake total air pressure is used to normalise the validated fuel pressure to sea level static conditions, for example using the expression:

$$PFUELVNor = \frac{PFUELV}{\left(\frac{P20V}{14.69}\right)}$$

where PFuelVNor is the normalised fuel pressure, 14.69 is the standard atmosphere pressure, and all pressures are in psia. If P20 is not available, normalisation can be based on the ambient air pressure P0. However, if necessary, normalisation can be omitted.

The validated and normalised fuel pressure is then input into a fuel staging control algorithm function. Within the fuel staging control algorithm function, the control software compares the validated and normalised fuel pressure with limits, which are defined to avoid exceeding either the fuel system capability or the flame stability. Thus, if a low fuel system pressure indicated by a fuel pressure measurement at the primary manifold is confirmed, the fuel staging control function commands to bias more fuel to the primary manifold. If a high fuel system pressure indicated by a fuel pressure measurement at the primary manifold is confirmed, the fuel staging control function commands to bias more fuel to the secondary manifold. The control software commands to stay in the current staging if the fuel pressure is within the required limits.

The EEC control algorithm 8 preferably uses a fuel pressure sensor located at the primary manifold 4 to provide the fuel flow split control signal. However, as indicated by the AND/OR statements in brackets in FIG. 5, the fuel pressure sensor may be located elsewhere in the fuel system, such as at the secondary manifold 6.

Another option is to use a fuel pressure sensor fuel pressure upstream of the fuel actuation system 10 (PFuel HMU Exit in FIG. 2). The fuel pressure measured here is a sum of the pressure drop across the fuel actuation system and the fuel pressure in either the primary manifold 4 or the secondary manifold 6 (whichever is higher). However, at most of engine conditions the pressure in the primary fuel manifold is higher than the pressure in the secondary manifold, so the fuel pressure upstream of the fuel actuation system can be used in place of a fuel pressure in the primary manifold, although with suitable adjusted comparison limits.

In this way, the EEC can implement a staging strategy which keeps the fuel pressure within safe limits, e.g. to maintain engine thrust even during inclement weather conditions. The engine control system can thus be made more reliable and robust.

Figure 6:
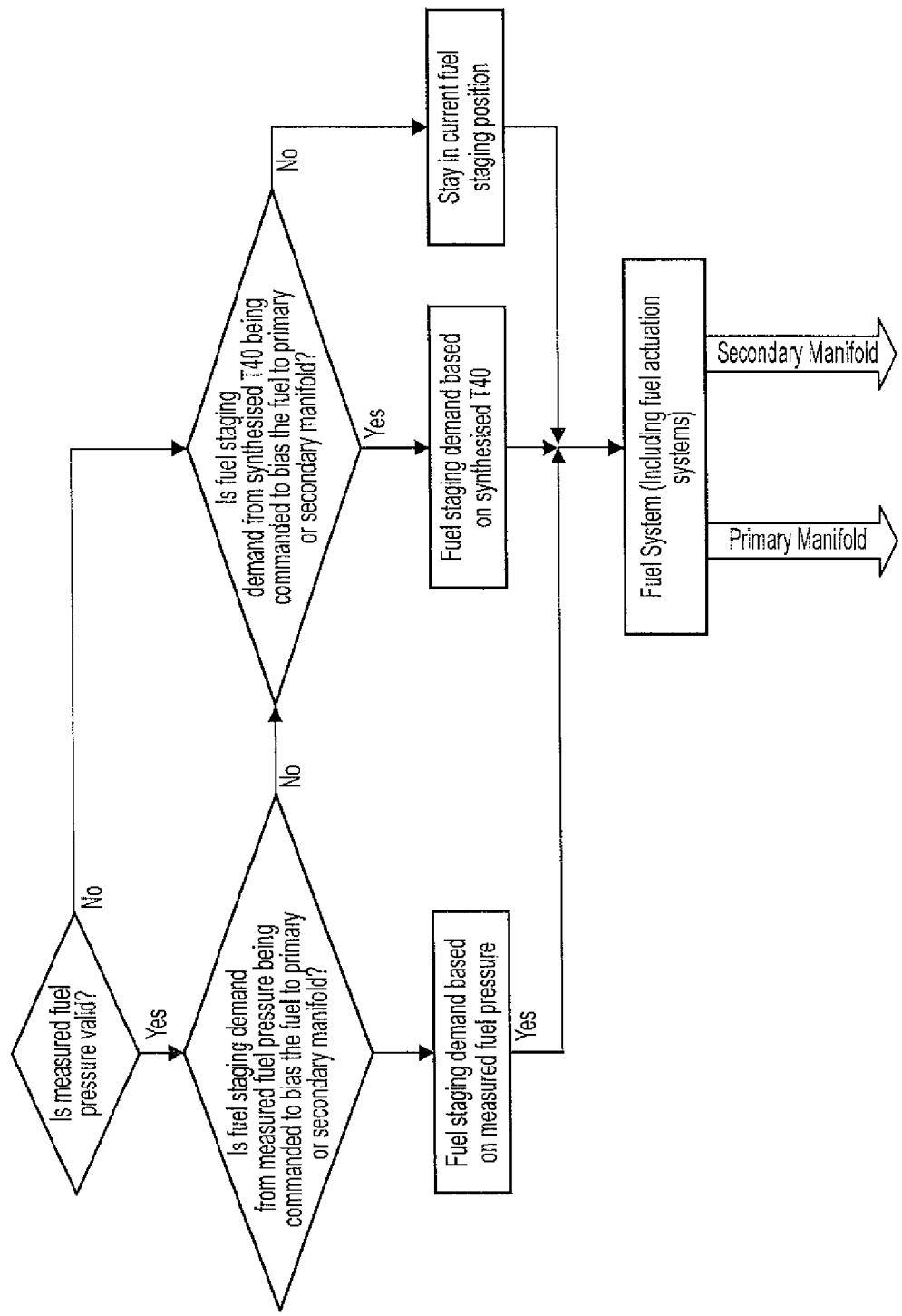
FIG. 6 is a flow diagram illustrating staging control based on sensed fuel pressure and synthesized combustor flame temperature.
Figure 7:
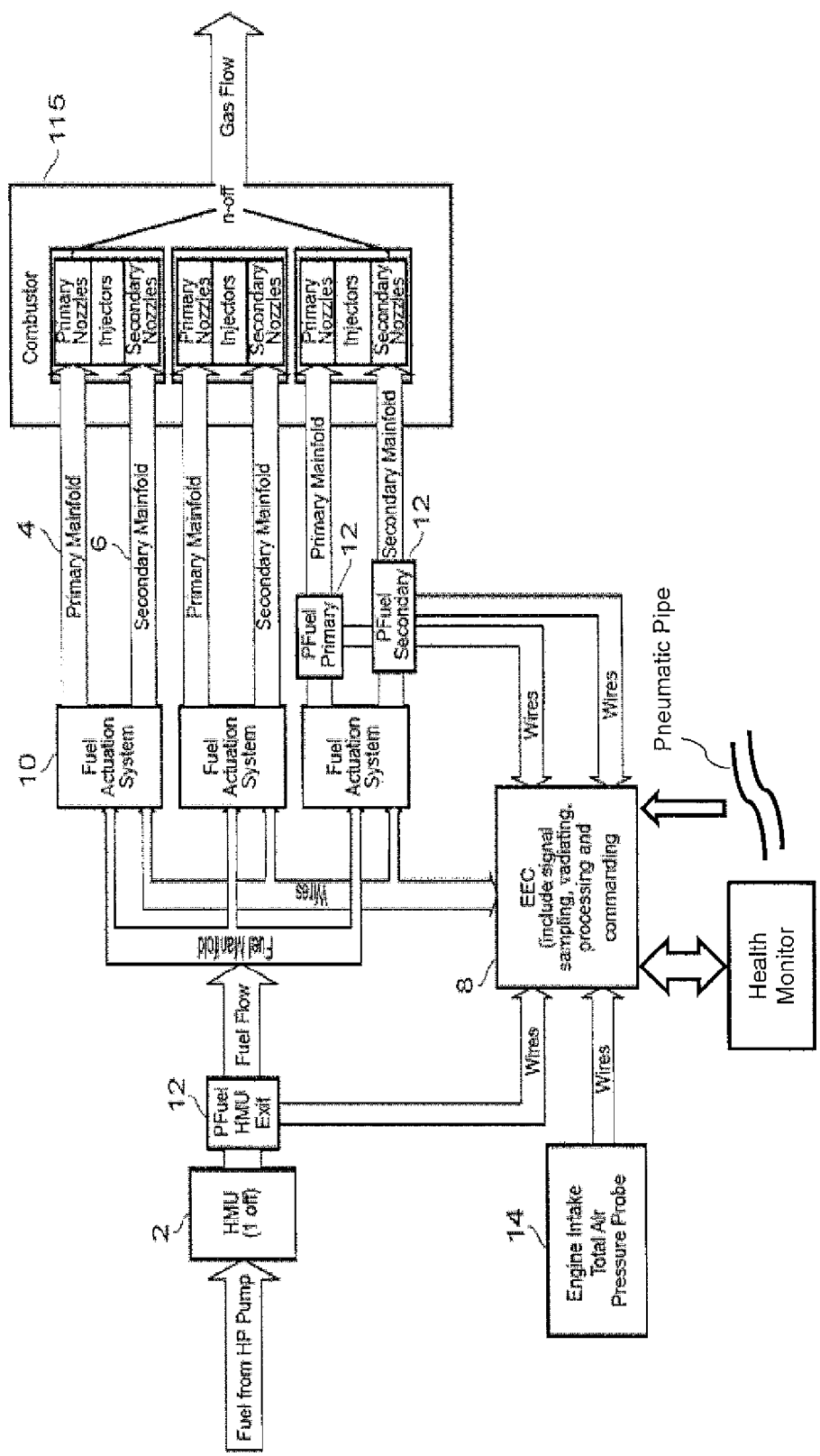
FIG. 7 shows schematically another variant of the fuel supply system of FIGS. 2 and 4.

A refinement of the staging strategy, however, is to implement staging based on a synthesised combustor flame temperature T40 (e.g. as described in U.S. Pat. No. 5,743, 079), in order to provide a low emissions combustion (e.g. for lean burn), but to use a fuel pressure-based strategy when T40 is erroneous or invalid, such as may be the case during inclement weather, surge/stall, engine flameout, power interrupt, engine starting (including windmill relight and auto relight) and engine flameout. FIG. 6 is a flow diagram illustrating staging control based on sensed fuel pressure and synthesized combustor flame temperature. If PFuel is valid and indicative of an unsafe pressure in one of the manifolds, fuel staging is based on the fuel pressure signal. Otherwise, fuel staging control is based on synthesized T40.

Additionally or independently of its use in staging control, the sensed fuel pressure(s) can be used, e.g. by the EEC 8, to implement health monitoring of the engine. In particular, the health monitoring can be based on a relation such as WFE=FN×$\sqrt{\text{PFuel}-\text{P30}}$, where WFE is the amount of fuel delivered to the injectors per second, P30 is the high pressure compressor exit pressure, and FN is the (known) total flow number through the injectors (and optionally through any further restrictors in any fuel lines between the fuel manifold(s) and injectors).

For example, the relation can be used to detect a leakage fault in a pneumatic pipe which connects an HP compressor exit pressure sensor. Compressed air at P30 air is piped from the HP compressor exit to a pressure transducer via the pneumatic pipe. By knowing WFE, Pfuel and FN, P30 pressure can be calculated from the above relation. The calculated P30 can then be compared with a sensed P30 (from the HP compressor exit pressure sensor) and if the difference is larger than a threshold a pipe leakage fault can be indicated.

In another example, a faulty combustor injector (or further restrictor) can be detected. By knowing WFE and FN under no fault conditions, the above relation can provide the no fault difference, ΔPc, between Pfuel and P30. The actual pressure difference, ΔPs, Pfuel and P30 can be determined from sensor signals. If the difference between ΔPc and ΔPs is larger than a threshold, then a combustor injector fault can be indicated.

In a further example, a faulty fuel metering valve, or a faulty fuel flow demand to the fuel metering valve can be detected. By knowing PFuel, P30 and FN, the delivered fuel flow, WFEcalc, can be calculated from the above relation and compared with the fuel flow demand WFEdem from the EEC 8 (or the fuel flow feedback WFEfmv from the fuel metering valve). If the difference between them is larger than a threshold, then a fuel system fault can be indicated.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred above are hereby incorporated by reference.

The invention claimed is:

1. A fuel supply system for feeding fuel to a multi-stage combustor of a gas turbine engine, the fuel supply system comprising:
    a plurality of fuel manifolds which distribute fuel to respective stages of the multi-stage combustor,
    a fuel metering valve operable to control a rate at which fuel passes to the plurality of fuel manifolds,
    an actuating arrangement which splits a fuel flow from the fuel metering valve between the plurality of fuel manifolds, and
    a control system for performing staging control of the multi-stage combustor;
    wherein the control system includes:
        a fuel pressure sensor arrangement which senses one or more sensed fuel pressures including a fuel pressure at entry to the actuating arrangement and/or fuel pressures in one or more of the plurality of fuel manifolds; and
        a controller which commands the fuel metering valve to supply fuel to the multi-stage combustor at a flow rate, and which repeatedly: (i) calculates a calculated fuel split between the plurality of fuel manifolds based on the one or more sensed fuel pressures, and (ii) issues a command signal to the actuating arrangement to implement the calculated fuel split, and
    wherein the controller calculates:
        (a) the calculated fuel split to divert fuel away from a particular manifold when the one or more sensed fuel pressures indicate that the fuel pressure in the particular manifold has exceeded a respective upper threshold pressure, and/or
        (b) the calculated fuel split to divert fuel towards a particular manifold when the one or more sensed fuel pressures indicate that the fuel pressure in the particular manifold is below a respective lower threshold pressure.

2. The fuel supply system according to claim 1, wherein the calculated fuel split is a first calculated fuel split;
    wherein, when the first calculated fuel split corresponds to no change in a current fuel split, the controller further: (iii) calculates a calculated combustor flame temperature, and (iv) calculates a second calculated fuel split between the plurality of fuel manifolds based on the calculated combustor flame temperature to replace the first calculated fuel split; and
    wherein the command signal issued to the actuating arrangement implements the second calculated fuel split in place of the first calculated fuel split.

3. The fuel supply system according to claim 1, wherein:
    the control system further includes an air pressure sensor which senses a sensed engine intake air pressure or a sensed ambient air pressure; and
    the controller normalizes the sensed fuel pressure using the sensed engine intake air pressure or the sensed ambient air pressure before calculating the calculated fuel split.

4. The fuel supply system according to claim 1, wherein the fuel distributed by the plurality of fuel manifolds is fed into the multi-stage combustor by a plurality of fuel injectors, and the control system further includes:
    a health monitor which, based on the one or more sensed fuel pressures, diagnoses a fault in one of: a pneumatic pipe which extends from a high pressure compressor of the gas turbine engine, a fuel injector of the plurality of fuel injectors, the fuel metering valve, or a fuel flow demand to the fuel metering valve.

5. A gas turbine engine having a fuel supply system for feeding fuel to a multi-stage combustor of the gas turbine engine, the fuel supply system comprising:
    a plurality of fuel manifolds which distribute fuel to respective stages of the multi-stage combustor,
    a fuel metering valve operable to control a rate at which fuel passes to the plurality of fuel manifolds, an actuating arrangement which splits a fuel flow from the fuel metering valve between the plurality of fuel manifolds, and a control system for performing staging control of the multi-stage combustor;

wherein the control system includes:

a fuel pressure sensor arrangement which senses one or more sensed fuel pressures including a fuel pressure at entry to the actuating arrangement and/or fuel pressures in one or more of the plurality of fuel manifolds; and a controller which commands the fuel metering valve to supply fuel to the multi-stage combustor at a flow rate, and which repeatedly: (i) calculates a calculated fuel split between the plurality of fuel manifolds based on the one or more sensed fuel pressures, and (ii) issues a command signal to the actuating arrangement to implement the calculated fuel split, and wherein the controller calculates:

(a) the calculated fuel split to divert fuel away from a particular manifold when the one or more sensed fuel pressures indicate that the fuel pressure in the particular manifold has exceeded a respective upper threshold pressure, and/or (b) the calculated fuel split to divert fuel towards a particular manifold when the one or more sensed fuel pressures indicate that the fuel pressure in the particular manifold is below a respective lower threshold pressure.

\* \* \* \* \*